June 19, 1934.  N. A. PETTER  1,963,379
FILLER FOR EGG BOXES
Filed July 29, 1932
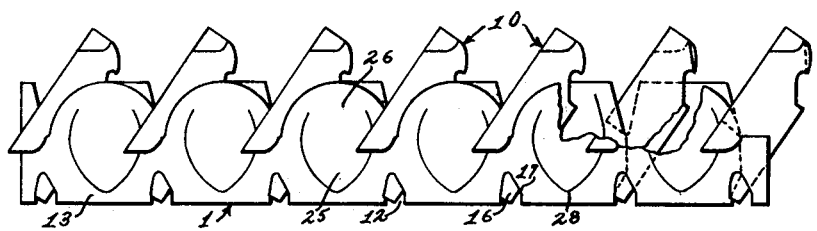
Fig. 1.
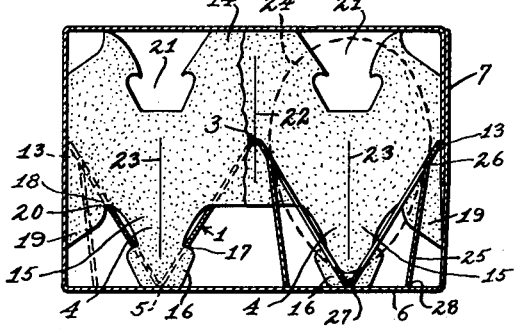
Fig. 4.
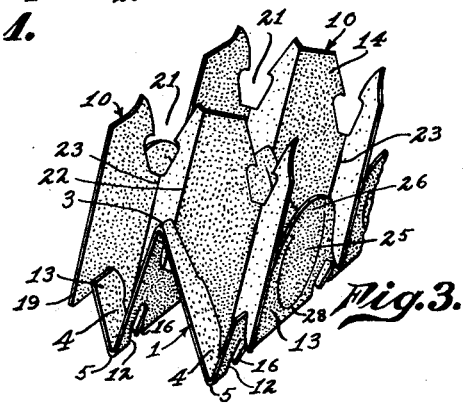
Fig. 3.
Fig. 2.
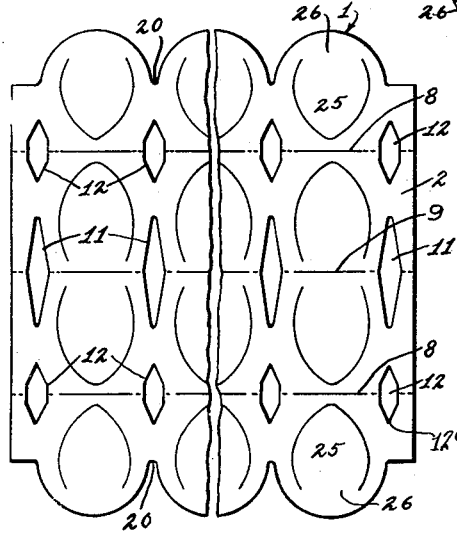
Fig. 6.
Fig. 5.
Inventor
Noel A. Petter
By 
Attorneys Patented June 19, 1934

1,963,379

UNITED STATES PATENT OFFICE 1,963,379

FILLER FOR EGG BOXES

Noel A. Petter, Los Angeles, Calif., assignor to Standard Paper Box Corporation, Los Angeles, Calif., a corporation of Delaware Application July 29, 1932, Serial No. 625,935

8 Claims. (Cl. 217—27)

This invention relates to filler of carton form to be used as a holder for articles, such as eggs, and is intended particularly to be useful as a filler in egg boxes to form pockets for holding the eggs in an outer box or container.

The general object of this invention is to produce fillers of this type, constructed so that they may be folded and packed in compact bundles, and which can be readily opened and set up into a filler to be placed in a box to receive eggs or similar articles.

Another object of the invention is to produce a filler of this type which will present a foldable body member presenting two or more egg troughs provided with partition members to divide the egg trough into egg compartments, and to provide a construction enabling the partition walls to be folded when the body member is folded into a collapsed or flat carton.

A further object of this invention is to produce a collapsible filler in which the partition members will operate to maintain a substantially V-form for the troughs when the filler is in its set-up position but which are so constructed as to enable them to fold when the filler is "knocked down" into its collapsed or flat condition.

A still further object of the invention is to improve the construction of fillers of this general type.

Further objects of the invention will appear hereinafter.

The invention consists of novel parts and combinations of parts to be described hereinafter, all of which contribute to produce an efficient filler for egg boxes.

A preferred embodiment of the invention is described in the following specification, while the broad scope of the invention is pointed out in the appended claims.

In the drawing—

Figure 1 is a plan of a collapsed or "knocked down" filler, that is, this view indicates the form of the filler when collapsed for shipment, certain parts being broken away so as to further illustrate details of the construction;

Figure 2 is a perspective showing one end of a filler embodying this invention, a portion of the filler being broken away;

Figure 3 is a perspective similar to Figure 2, but representing the filler in a partially collapsed condition, that is, in an intermediate state between the set-up condition illustrated in Figure 2, and the collapsed or flat condition illustrated in Figure 1;

Figure 4 is a vertical section taken through the filler and an egg box into which the filler is intended to be placed; the section at the right of this view is taken through the center of one of the egg compartments, while the section at the left of this view is taken substantially in the plane of one of the partition members;

Figure 5 is a plan (broken away at its middle point) of a blank out of which the body member of the filler is formed; and Figure 6 is an elevation of one of the partition members.

Referring more particularly to the parts, the filler comprises a body member 1, which, in the present instance, is formed of a blank 2 (illustrated in Figure 5) and folded longitudinally to form a ridge 3 which is disposed centrally between two egg troughs 4, the egg troughs being substantially of V-form with bottom angles 5 or folded edges that support the filler by resting upon the bottom 6 of the box or container 7 (see Figure 4) in which the filler may be placed.

In order to facilitate bending the body member or longitudinal member 1 to the form indicated, the blank 2 is provided with two longitudinal crease lines 8 between which is located a central crease line 9. Crease line 9 forms the ridge 3 while the crease lines 8 form the bottom or bottom angles 5 of the filler.

The filler is provided with a plurality of partition members or walls 10 mounted in a vertical position and interlocked with the body member so as to form egg compartments in the egg troughs 4.

In order to enable the filler to collapse readily into the form indicated in Figure 1, I provide the ridge 3 with a plurality of transverse slots 11 (see Figure 5), and these slots are preferably of maximum width in line with ridge 3. These slots enable a loose interlocking connection to be effected between the partitions and the body member.

The bottoms of the egg troughs 4 are also provided with similar transverse slots 12 as indicated at Figure 5. Slots 11 and 12 are most conveniently formed by punching them in the blank. When the filler is in its set-up condition the troughs are of V-form and each trough presents an outer wall 13 that inclines upwardly and outwardly.

The partition members 10 and the bottoms of the troughs 4 are provided with interlocking means, and interlocking means is also provided between the side portions of the partition members and the side walls 13 so as to enable the partition members to brace the side walls 13 and maintain the V-shape of the troughs. In order to accomplish this, the partition members are preferably formed substantially as indicated in the blank 14 (see Figure 6). Blank 14 is provided with two downwardly projecting tongues 15 preferably enlarged into heads 16 at their lower ends so as to form shoulders 17 on the side edges of each tongue. In addition, the lower side portions of the partition members are formed with notches 18 beyond which the side edge of the partition presents a downwardly projecting dog or tongue 19.

The upper edges of the side walls 13 are provided with relatively deep notches 20 that cooperate with the notches 18 when the partitions are placed in the troughs by shoving the tongues 15 down through the slots 12. When this is done, the shoulders 17 will engage the edges of the slots 12 at their ends 12ᵃ and lock the partitions in place. Likewise, the notches 20 in the edges of the side walls 13 will be engaged by the notches 18 to limit the outward swinging movement of the side walls 13 when the filler is set up.

The blanks 14 for the partition members can be struck end to end from a strip so that the upper edge of each blank will present a deep recess or notch 21 having the form of the tongue 15 of the next blank which is struck from the strip. Each blank 14 is provided with a central crease line 22 which is in alinement with the ridge 3 and similar crease lines 23 are provided in line with the centers of the tongues 15, that is, in line with the bottom angles 5 of the body member 1.

In order to adapt the filler to hold eggs such as the egg 24 in the compartments, I prefer to provide the outer walls with openings formed in them by striking out a tongue or flap 25, having its root 26 at its upper end. The lower end of the tongue does not extend all the way down to the bottom angle 5 of the trough, but terminates at a point above this level so as to produce a shallow V-shaped cup or socket 27 (see Figure 4) upon which the small end of the egg rests when it is received in the egg pocket. The flaps or tongues 25 are of such length as to insure that their lower edge 28 will engage the bottom 6 of the box while the flap is in an inclined position (see Figure 4). In other words, when the filler is set up and in the box 7 with eggs in the egg compartments, the lower edge 28 of each tongue will lie in the same plane with the bottom angles 5 of the troughs and will operate to brace and support the outer side walls 13 of the troughs.

The filler constructed as described can readily be collapsed into the form indicated in Figure 1. In doing this, the central portions of the fillers are folded so as to form a dihedral angle facing toward one end of the filler and at the other crease lines 23, the material of the partition member is folded in an opposite direction so as to form a dihedral angle facing toward the other end of the filler.

By folding the partition members in this way and at the same time pressing in the side walls 13 of the body member, the partition members will fold as indicated, and as they become folded they are swung toward the end of the filler. As illustrated in Figure 1, the partition members have all swung toward the right end of the carton. This swinging movement is permitted by reason of the width of the slots 11 and 12 at their middle points, and enables the collapsing of the filler to be accomplished without tearing either the partition or the side walls at the interlocking notches 18 and 20. The blanks for forming the filler can readily be stamped out very inexpensively by machinery from cardboard, and at the same time creased or slit to form the crease lines necessary in the partition members and in the body blank 2. The blanks can readily be assembled upon the complete filler which can be shipped in the collapsed form indicated in Figure 1. In this condition, the fillers occupy very little space and form compact bundles, readily adapting them for shipment.

When the filler is in a carton and filled with eggs the outer ends of the side walls 13 rest against the wall of the carton and assist the flaps 25 in supporting the side walls. And the side walls 13 keep the side walls of the carton out of contact with the eggs.

The partition walls 10 are deeper than the length of the eggs so that the carton cover and its bottom are also kept out of contact with the eggs. This of course prevents breakages.

It is understood that the embodiment of the invention described herein is only one of the many embodiments this invention may take, and I do not wish to be limited in the practice of my invention, nor in my claims, to the particular embodiment set forth.

What I claim is:

1. A filler for holding eggs or the like, having a body member with a longitudinally extending ridge and with an egg trough at each side of the ridge, said ridge and the bottoms of the troughs having a plurality of alining transverse slots therein, partition members received in the said slots and forming egg compartments in the troughs, said partition members having substantially vertical crease lines therein in alinement with the ridge and in alinement with the bottoms of the troughs, said longitudinal member and said partition members cooperating to fold into a flat carton in which the body member is folded on the ridge line and on lines extending longitudinally at the bottoms of the troughs, and said partition members are folded on the said crease lines.

2. A filler for holding eggs or the like, having a body member with a longitudinally extending ridge and with an egg trough at each side of the ridge, said ridge and the bottoms of the troughs having a plurality of alining transverse slots therein, partition members received in the said slots and forming egg compartments in the troughs, said partition members having substantially vertical crease lines therein in alinement with the ridge and in alinement with the bottoms of the troughs, means for interlocking the lower portions of the partition members with the body member adjacent the bottoms of the troughs, said body member and said partition members cooperating to fold into a flat carton in which the body member is folded on the ridge line and on lines extending longitudinally at the bottoms of the troughs and said partition members are folded on the said crease lines.

3. A filler for holding eggs or the like, having a body member with a longitudinally extending ridge and with an egg trough at each side of the ridge, said ridge and the bottoms of the troughs having a plurality of alining transverse slots therein, partition members received in the said slots and forming egg compartments in the troughs, said partition members having substantially vertical crease lines therein in alinement with the ridge and in alinement with the bottoms of the troughs, said partition members having downwardly projecting tongues with shoulders on their edges for engaging the edges of the slots at the bottoms of the troughs for interlocking the partition members with the body member, said body member and said partition members cooperating to fold into a flat carton in which the body member is folded on the ridge line and on lines extending longitudinally at the bottoms of the troughs, and said partition members are folded on the said crease lines.

4. A filler for holding eggs or the like, having a body member with a longitudinally extending ridge and with an egg trough at each side of the ridge, said ridge and the bottoms of the troughs having a plurality of alining transverse slots therein, partition members received in the said slots and forming egg compartments in the troughs, said partition members having substantially vertical crease lines therein in alinement with the ridge and in alinement with the bottoms of the troughs, said troughs being of substantially V-form with upwardly and outwardly inclining outer side walls, interlocking means for connecting the lower portions of the partition members with the bottoms of said troughs, and interlocking means for effecting connections between the partition members and the said outer side walls of the troughs, said body member and said partition members cooperating to fold into a flat carton in which the body member is folded on the ridge line and on lines extending longitudinally at the bottoms of the troughs, and said partition members are folded on the said crease lines.

5. A filler for holding eggs or the like, having a body member with a longitudinally extending ridge and with an egg trough at each side of the ridge, said ridge and the bottoms of the troughs having a plurality of alining transverse slots therein, partition members received in the said slots and forming egg compartments in the troughs, said partition members having substantially vertical crease lines therein in alinement with the ridge and in alinement with the bottoms of the troughs, interlocking means for effecting connection between the lower portions of the partition members and the bottoms of the troughs, said troughs being of substantially V-form and having upwardly and outwardly inclined outer side walls with notches in their upper edges located substantially in alinement with the said partition members, said partition members having notches in their under sides interlocking with the last named notches enabling the partition walls to maintain the troughs in their V-form, said body member and said partition members cooperating to fold into a flat carton in which the body member is folded on the ridge line and on lines extending longitudinally at the bottoms of the troughs, and said partition members are folded on the said crease lines.

6. A filler for holding eggs or the like, having a body member with a longitudinally extending ridge and with an egg trough at each side of the ridge, said ridge and the bottoms of the troughs having a plurality of alining transverse slots therein, partition members received in the said slots and forming egg compartments in the troughs, said partition members having substantially vertical crease lines therein in alinement with the ridge and in alinement with the bottoms of the troughs, said longitudinal member and said partition members cooperating to fold into a flat carton in which the body member is folded on the ridge line and on lines extending longitudinally at the bottoms of the troughs, and said partition members are folded on the said crease lines, said troughs being of substantially V-form with outer side walls inclining upwardly and outwardly, said outer side walls having openings therein with integral flaps projecting downwardly from the upper edges of said openings respectively, the lower edges of said tongues operating to rest upon a horizontal support for the filler, and located substantially in the plane of the bottoms of said troughs, when said last named tongues are disposed in an inclined position.

7. A filler for holding eggs or the like, having a body member with a longitudinally extending ridge and with an egg trough at each side of the ridge, said ridge and the bottoms of the troughs having a plurality of alining transverse slots therein, partition members received in the said slots and forming egg compartments in the troughs, said partition members having substantially vertical crease lines therein in alinement with the ridge and in alinement with the bottoms of the troughs, said partition members having downwardly projecting tongues passing through the slots in said troughs with the lower ends of the tongues in alinement with the bottoms of the troughs, the side portions of said partition members having means for interlocking with the outer side walls of said troughs, said longitudinal member and said partition members cooperating to fold into a flat carton in which the body member is folded on the ridge line and on lines extending longitudinally at the bottoms of the troughs, and said partition members are folded on the said crease lines.

8. A filler for holding eggs or the like having a body member with a longitudinal ridge and an egg trough at each side of the ridge, each egg trough having an upwardly and outwardly inclined side wall, partition members connected with the body member to divide the troughs into compartments, each of said partition members having crease lines on which each partition member folds upon itself, and located in alinement substantially with the ridge and with the bottoms of said troughs, said partitions and said body member having a loose interlocking connection enabling the filler to be folded into collapsed form with the partition members folded on said crease lines.

NOEL A. PETTER.